(12) United States Patent
Thompson

(10) Patent No.: US 7,669,835 B2
(45) Date of Patent: Mar. 2, 2010

(54) CLOSURE SYSTEM, METHOD OF USE, AND DEVICES INCLUDING CLOSURE SYSTEM

(75) Inventor: Rocke P. Thompson, Bountiful, UT (US)

(73) Assignee: Techxotic LC, Clearfield, UT (US)

( * ) Notice: Subject to any disclaimer, the term of this patent is extended or adjusted under 35 U.S.C. 154(b) by 1397 days.

(21) Appl. No.: 11/049,375

(22) Filed: Feb. 2, 2005

(65) Prior Publication Data

US 2006/0177315 A1    Aug. 10, 2006

(51) Int. Cl.
*B66D 3/04* (2006.01)
(52) U.S. Cl. .................. 254/406; 254/402
(58) Field of Classification Search .......... 254/402, 254/405, 406
See application file for complete search history.

(56) References Cited

U.S. PATENT DOCUMENTS

| | | |
|---|---|---|
| 686,154 A | 11/1901 | Smith |
| 796,366 A | 8/1905 | Smith |
| 2,382,049 A | 8/1945 | Frankhouser |
| 2,449,703 A | 9/1948 | Johnson |
| 2,555,059 A | 5/1951 | Schrader |
| 2,633,329 A | 3/1953 | Le Bus |
| 2,741,458 A | 4/1956 | Le Bus, Sr. |
| 2,754,084 A | 7/1956 | Le Bus, Sr. |
| 3,372,908 A | 3/1968 | McCarthy |
| 3,819,154 A | 6/1974 | Miller |
| 3,899,158 A | 8/1975 | Johnson |
| 3,999,739 A | 12/1976 | Vick et al. |
| 4,056,257 A | 11/1977 | Kaiser |
| 4,253,218 A | 3/1981 | Gibbs |
| 4,325,537 A | 4/1982 | Winter et al. |
| 4,614,332 A | 9/1986 | Wilson |
| 4,667,772 A | 5/1987 | Kammerer |
| 4,760,993 A | 8/1988 | Du Preez |
| 5,054,577 A | 10/1991 | Petzl et al. |
| 5,056,760 A * | 10/1991 | Jorgensen .................. 254/406 |
| 5,249,543 A * | 10/1993 | Rutgerson et al. ........... 114/108 |
| 5,328,298 A | 7/1994 | Maffatone |
| 5,348,116 A | 9/1994 | Pickering |
| 5,400,869 A | 3/1995 | Rocourt |
| 5,636,704 A | 6/1997 | Castaneda |
| 5,725,200 A | 3/1998 | Gordon |
| 5,845,894 A | 12/1998 | Petzl et al. |
| 5,913,479 A | 6/1999 | Westwood, III |
| 6,244,570 B1 | 6/2001 | Habberstad |

(Continued)

OTHER PUBLICATIONS

Webpage, http://www.bmsrescue.com/chesroll.html, BMS Rescue Equipment—Products—Chest Roller, Jan. 27, 2005, 1 page.

(Continued)

*Primary Examiner*—Emmanuel M Marcelo
(74) *Attorney, Agent, or Firm*—TraskBritt

(57) ABSTRACT

A closure system and various exemplary embodiments for devices including the closure system are disclosed. The closure system may include a base, a sideplate configured to rotate with respect to the base, and a retaining mechanism carried by the sideplate and configured to pivot with respect to the sideplate substantially transverse to an axis of rotation of the sideplate. The retaining mechanism may be configured to engage with a engagement protrusion of the base to prevent rotation of the sideplate. A chest roller, a snatch block, an ascender including the closure system and a method of use of the closure system, are additionally disclosed.

51 Claims, 9 Drawing Sheets

U.S. PATENT DOCUMENTS

| | | | |
|---|---|---|---|
| 6,263,999 | B1 | 7/2001 | Atkinson et al. |
| 6,478,346 | B1 | 11/2002 | Veser et al. |
| 6,481,695 | B1 | 11/2002 | Fuller |
| 6,488,267 | B1 | 12/2002 | Goldberg et al. |
| 6,651,962 | B2 | 11/2003 | Habberstad |
| 6,669,248 | B2 | 12/2003 | Shirase |
| 6,840,551 | B2 | 1/2005 | Evans |
| 7,347,411 | B1 * | 3/2008 | Teel et al. .................... 254/405 |
| 7,431,269 | B2 * | 10/2008 | Carlson et al. .............. 254/405 |

OTHER PUBLICATIONS

Webpage, http://www.petzl.com, Petzl Sport—Products—ASCENSION, Feb. 1, 2005, 1 page.

Webpage, http://www.petzl.com Petzl Sport—Products—BASIC, Feb. 1, 2005, 1 page.

Webpage, http://www.petzl.com Petzl Sport—Products—PRO TRAXION, Oct. 26, 2004, 1 page.

Webpage, http://www.petzl.com Petzl Sport—Products—RESCUE, Oct. 26, 2004, 1 page.

Webpage, http://www.bdel.com/gear/rock/pulley.php, Black Diamond Equipment: Gear: Rock: Pulley, Oct. 26, 2004, 2 pages.

Webpage, http://www.altrec.com/shop/detail/3684, Northwest River Supplies Yates Rescue Pulley—Altrec.com, Oct. 26, 2004, 2 pages.

Webpage, http://www.onropel.com, On Rope 1, Oct. 25, 2004, 2 pages.

Snatch Blocks, Blocks—Special Purpose, Ronstan, pp. 46-48.

Webpage, http://www.apsltd.com/Tree/d3000/e242.asp, APS—Snatch Blocks & Magic Boxes, Oct. 26, 2004, 3 pages.

Webpage, http://www.smcgear.net/swivel.htm, SMC Rescue Swivel, Oct. 25, 2004, 1 page.

Webpage, http://www.mtntools.com/cat/bigwall/pullev/petzlswivel.htm, Petzl Rescue & Haul Bag Swivel—Mountain Tools, Oct. 25, 2004, 1 page.

* cited by examiner

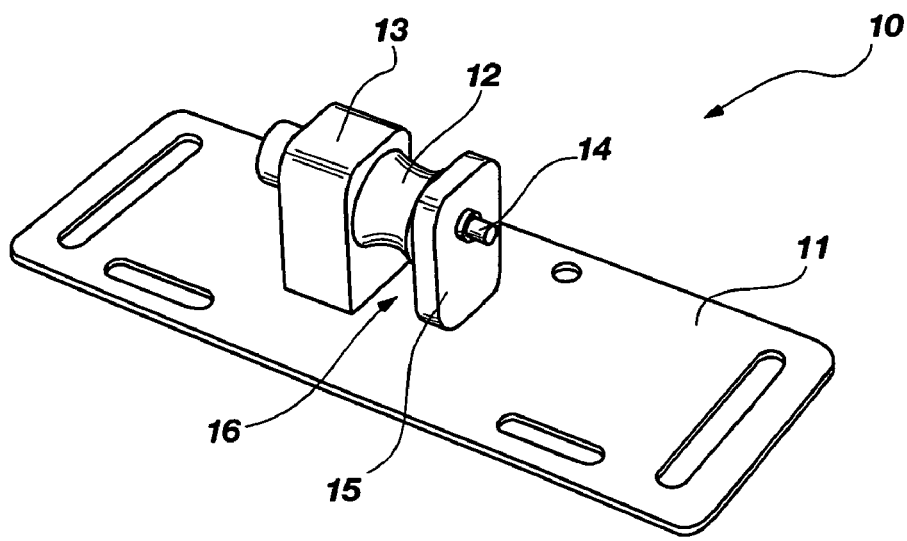
FIG. 1
*(PRIOR ART)*
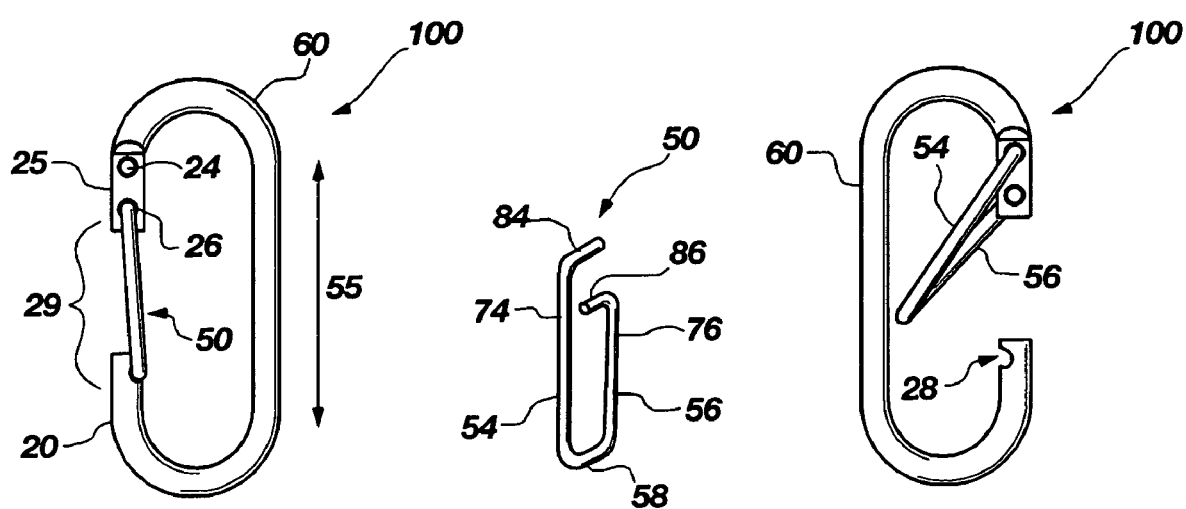
FIG. 2A
*(PRIOR ART)*
FIG. 2B
*(PRIOR ART)*
FIG. 2C
*(PRIOR ART)*

CLOSURE SYSTEM, METHOD OF USE, AND DEVICES INCLUDING CLOSURE SYSTEM

BACKGROUND OF THE INVENTION

1. Field of the Invention

The present invention relates to a closure system, a method of use of same, and devices including the closure system such as, by way of example, a chest roller, a snatch block, and an ascender.

2. State of the Art

Chest rollers are used for various applications in many different activities. A conventional chest roller 10, depicted in FIG. 1 is typically associated with rope work in vertical terrain, such as caving and rescue work. An individual ascending or descending a free-hanging rope may be secured to the rope with a waist harness, and a chest roller is worn to keep the individual in an upright position, with his or her chest proximate the rope. A baseplate 11 may be affixed to the chest of the individual as by straps or webbing, and the rope will pass through opening 16 and abut sheave 12. As the individual ascends or descends, the chest roller 10 also moves up or down on the rope, and the sheave 12 rotates about an axle or pin (unnumbered) affixed to a pedestal 13 to minimize the friction on the rope. The closure system of the chest roller 10 includes a sideplate 15 which is movable when button 14 is depressed, enabling the rope to be laterally inserted or removed from the opening 16. However, the sideplate 15 is not directly affixed to the baseplate 11, requiring any outward forces on the sheave 12 to be transferred to the baseplate 11 through pedestal 13. The uneven loading on the pedestal 13 by the cantilevered sheave 12 puts additional stress in the form of bending and shear stress on the connection between the baseplate 11 and the pedestal 13.

Carabiners are also conventionally used in roped activities. FIGS. 2A, 2B and 2C illustrate one conventional carabiner 100 in which the carabiner body 60 of the carabiner 100 consists of a single round metal shank formed in a generally C-shape with two ends, a securing end 25 and a receiving end 20. The oblong C-shape of the carabiner body 60 forms a mouth 29 between ends 20 and 25. As further shown in FIG. 2B, a gate 50 is typically a single piece made of heavy round metal wire, having two ends 74, 76. The gate wire is bent to form an oblong shape having a closed U-shaped head 58, a long arm 54 and a short arm 56 which converge upwardly. The ends 74, 76 of the gate 50 are each turned inward at a right angle about a radius to form stems 84, 86, respectively. One of arms 54, 56 is raised with respect to the other arm by being pivoted or twisted at the point connecting the arm to head 58. Accordingly, if gate 50 is placed on a level surface, the head 58 and one arm 54, 56 will lay flat, while the other arm will form an upward angle with the surface. This result will occur regardless of which arm 54, 56 is placed on the level surface.

The securing end 25 of the carabiner 100 is slightly tapered to form flattened, parallel side surfaces, and two linearly adjacent supporting holes 24, 26 are bored therethrough. The diameter of the wire for the gate 50 is substantially smaller than the diameter of the carabiner body 60 so that stems 84, 86 of gate 50 fit into the supporting holes 24, 26, respectively. The stems 84, 86 are of sufficient length to pass into the entire length of supporting holes 24, 26 transverse to the side surfaces, respectively, without extending outside the respective supporting holes 24, 26. Supporting holes 24, 26 pivotally connect the gate 50 with the carabiner body 60 50 that gate 50 may be opened and closed.

In the closed position of FIG. 2A, the gate 50 extends to the receiving end 20 of the carabiner body 60. Since one arm 54, 56 of gate 50 is twisted and supporting holes 24, 26 are linearly aligned, a spring-like, biasing force is created when gate 50 is connected to the securing end 25. Accordingly, head 58 of gate 50 is biased to the closed position against the inside of the receiving end 20 of the carabiner body 60. The gate 50 may thus provide structural support for the carabiner 100 under tensile loading along the major axis 55. As shown in FIG. 2c gate 50 may be opened by applying an inward force on the gate 50. The gate 50 of the carabiner 100 provides a closure system with structural support; however, the gate 50 is prone to an accidental opening because only an inward force in a single direction is required to cause the gate 50 to open.

In view of the foregoing, it appears that a closure system having a quick and straightforward sideplate opening and closing mechanism that may be securely closed is needed. A sideplate configuration adding structural support would also be useful.

BRIEF SUMMARY OF THE INVENTION

The present invention, in a number of embodiments, includes closure systems that may be opened to receive, for example, a bight of rope, line, cable or other similar elongated element. The closure system may additionally provide structural support to the assembly in which it is incorporated.

In an exemplary embodiment of the present invention, a closure system includes a base having an engagement protrusion, a pin carried by the base, a sideplate configured to rotate about the pin, and a retaining mechanism carried by the sideplate and configured to pivot with respect to the sideplate substantially transverse to an axis of rotation of the sideplate, the retaining mechanism configured to engage with the engagement protrusion of the base to prevent rotation of the sideplate.

The retaining mechanism may comprise a wire gate, and may be resiliently biased toward, or in the alternative, away from the sideplate. The retaining mechanism may provide structural support between the base and the sideplate when engaged.

In another exemplary embodiment of the present invention, a chest roller comprises a baseplate, a pedestal mounted on the baseplate, the pedestal including a pin protruding therefrom, a sheave rotatable about the pin, a sideplate rotatable about the pin, and a retaining mechanism configured to pivot with respect to the sideplate substantially transverse to an axis of rotation of the sideplate, the retaining mechanism configured to engage with the baseplate to prevent rotation of the sideplate. The retaining mechanism may be resiliently biased, releasable with a single motion, for example by a single, substantially linear motion of a digit of a user's hand against the resilient bias, and rotationally operable by one hand of a user. Thus, the sideplate may be released for pivotal movement and pivoted by the user to an open position with one hand to enable insertion or removal of a bight of rope between the pedestal and the sideplate. Similarly, the sideplate may be pivoted back to a closed position and engaged by the retaining mechanism with one hand.

In yet another exemplary embodiment of the present invention, a snatch block comprises an assembly head, one sideplate fixed to the assembly head, a pin projecting from the first sideplate, and another, second sideplate configured for a pivot action with respect to the assembly head about the pin to open the snatch block for lateral insertion of a bight of rope between the sideplates. A sheave may be mounted between the sideplates for rotation about the pin. A retaining mechanism carried by the another sideplate is configured for engaging the assembly head to prevent the pivot action and retain the another sideplate to, the assembly head. The retaining mechanism may be resiliently biased, releasable with a single motion, for example by a single, substantially linear motion of a digit of a user's hand against the resilient bias, and rotationally operable by one hand of a user. Thus, the another sideplate may be released for pivotal movement and pivoted by the user to an open position with one hand to enable insertion or removal of a bight of rope between the sideplates. Similarly, the another sideplate may be pivoted back to a closed position and engaged by the retaining mechanism with one hand.

The retaining mechanism may comprise, for example, a resiliently biased wire gate. The wire gate may be resiliently biased toward the another sideplate and away from the assembly head, or the wire gate may be resiliently biased toward the assembly head and away from the another sideplate. A protrusion formed in the assembly head may be configured to engage with the retaining mechanism.

In yet another exemplary embodiment of the present invention, an ascender comprises a body having a flange, a pin projecting from the body, a locking device rotatably mounted on the body and configured for engaging an elongated element against the flange, a sideplate pivotally mounted with respect to the body about the pin, and a retaining mechanism carried by the sideplate and configured to pivot with respect to the sideplate substantially transverse to an axis of rotation of the sideplate, the retaining mechanism configured to engage with the body to prevent rotation of the sideplate. In a closed position, with the retaining mechanism engaged with the body, the sideplate may restrain the locking device from rotation with respect to the body.

The present invention also encompasses a method of use of the closure system of the present invention.

These features, advantages, and alternative aspects of the present invention will be apparent to those skilled in the art from a consideration of the following detailed description taken in combination with the accompanying drawings.

BRIEF DESCRIPTION OF THE SEVERAL VIEWS OF THE DRAWINGS

In the drawings, which illustrate what is currently considered to be the best mode for carrying out the invention:

FIG. 1 illustrates a conventional chest roller;

FIGS. 2A-2C illustrate a conventional carabiner;

DETAILED DESCRIPTION OF THE INVENTION

Figure 3:
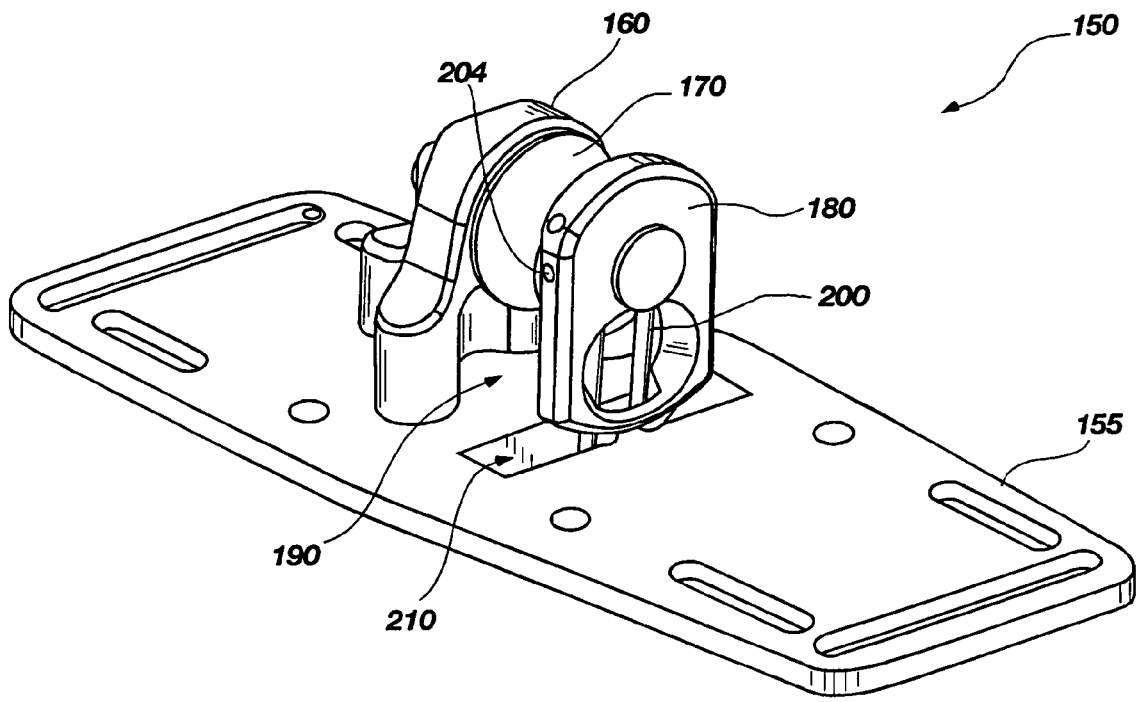
FIGS. 3-7 illustrate an exemplary embodiment of a chest roller and a wire latch of the present invention.

The present invention, in a number of embodiments, includes a closure system having a retaining mechanism and a sideplate that is pivotable with respect to a base structure, enabling access, for example, to a pass in the base structure. The closure system may enable insertion or removal of an object, for example a bight of rope, cable or chain in the pass in the base structure. The closure system may be useful in equipment used with ropes, such as a chest roller, a snatch block, or an ascender.

One exemplary embodiment of a chest roller 150 according to the present invention is depicted in FIGS. 3-7. The chest roller 150 includes a baseplate 155 and a pedestal 160 mounted thereon. The pedestal 160 and baseplate 155 may be separately fabricated and joined, as by a mechanical fastener or welding, or may be integrally formed, as from a single block of metal by machining. A pin 165 (see FIG. 5) extends through the pedestal 160, a sheave 170, and a sideplate 180. The sideplate 180 is rotatable about the pin, enabling lateral access to a through-hole 190 bounded by the baseplate 155, pedestal 160, sheave 170, and sideplate 180. The chest roller 150 is illustrated in a closed, latched position in FIG. 3, and an open position in FIG. 4. In the closed position, a bight of rope (not shown) may be secured in the through-hole 190 by the baseplate 155, pedestal 160, sheave 170 and sideplate 180. The chest roller 150 may be opened by disengaging a retaining device or mechanism shown schematically as a wire gate 200, and rotating the sideplate 180 away from baseplate 155.

The wire gate 200 may comprise a single piece of wire, for example a stainless steel wire with a round cross-section. The wire is bent, with a U-shaped head 205 for engaging a protrusion 220 extending into slot 210 on the baseplate 155. The wire gate 200 may be shaped in an elongated loop and pivotally connected to the sideplate 180. One end of the elongated loop is cut, presenting two oppositely facing free ends (not shown). The free ends of the wire gate 200 may be turned inward, as shown in FIG. 2B, forming stems 84, 86. Alternatively, the ends of the wire may be turned outward, as shown in the wire gate 400 of FIG. 9, forming outward-facing stems 407, 408. Returning to FIGS. 3 through 7, each free end of wire gate 200 is secured within a hole 204, 206 in the sideplate 180. The holes 204 and 206 are offset. The offset relation of the holes 204 and 206 creates a spring-like bias. The U-shaped head 205 of the wire gate 200 is thus biased against the sideplate 180, where it may be positioned within a notch 185.

Figure 5:
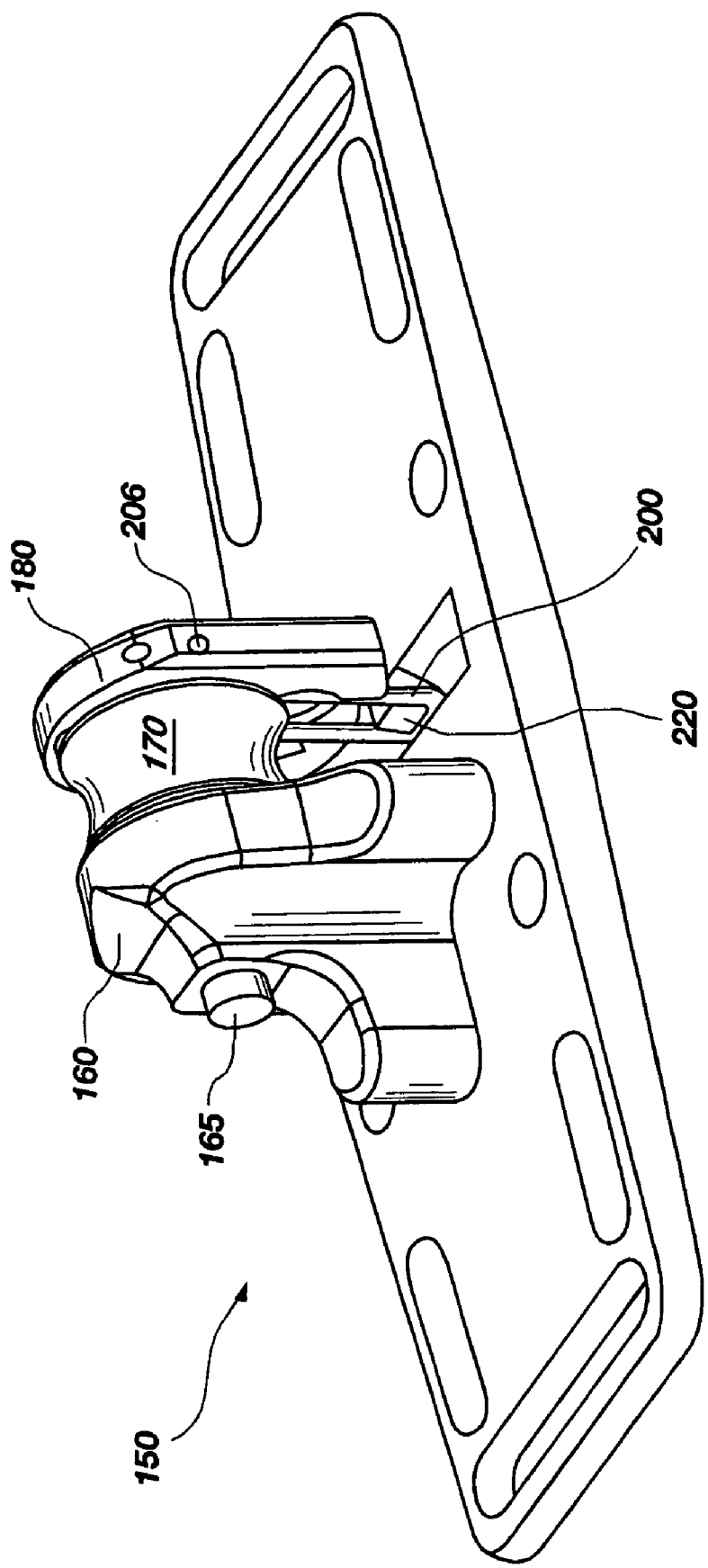
Figure 6:
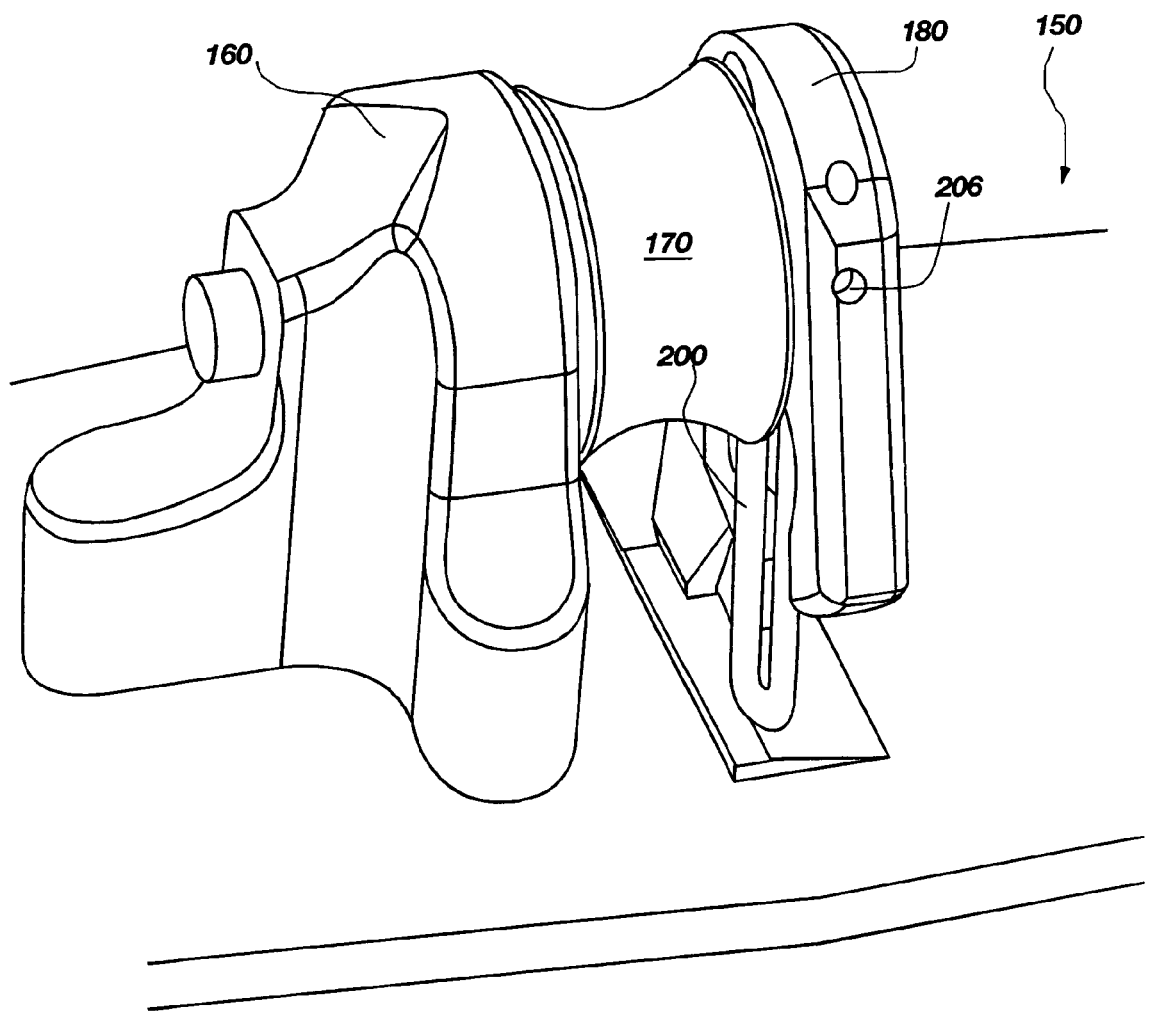
Figure 7:
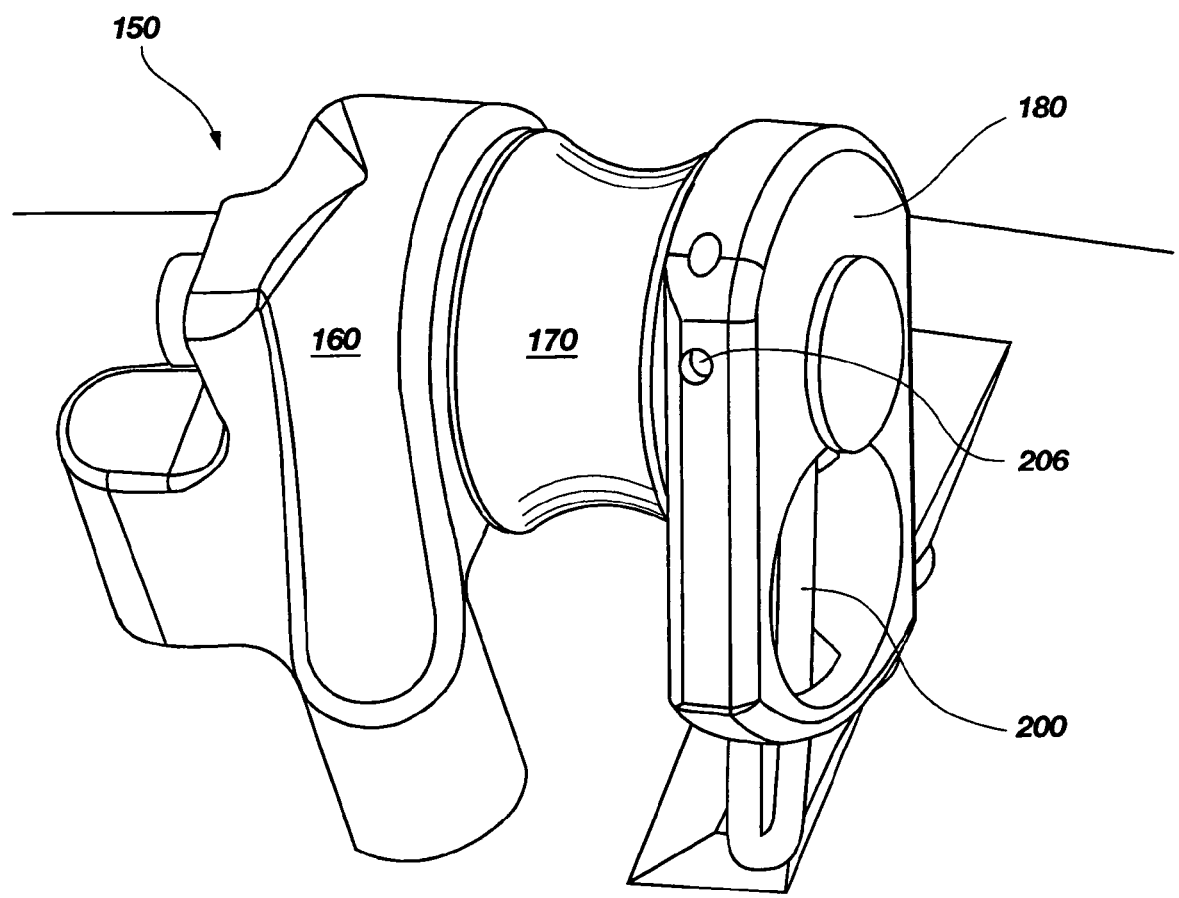

A user may contact the wire gate 200 through an aperture 187 in the sideplate 180, as with one or more fingers, and release the wire gate 200 by applying a force in the direction of the pedestal 160. The wire gate 200 then may be pivoted with U-shaped head 205 released from protrusion 220 responsive to the applied force about a fulcrum on the sideplate 180 with an axis of rotation different than, such as substantially transverse to, an axis of rotation of the sideplate 180. The wire gate 200 is depicted in FIG. 5 with U-shaped head 205 engaged with the protrusion 220 of the baseplate 155. The wire gate 200 may be disengaged from the protrusion 220 by pivoting toward the pedestal 160, as shown in FIG. 6, enabling the sideplate 180 to swivel, thereby opening the chest roller 150. The wire gate 200 is movable with respect to the pedestal 160 in multiple directions. The wire gate 200 is movable with the pivot action with respect to the sideplate 180, and the wire gate 200 when released from protrusion 220 may be rotated in conjunction with the sideplate 180 about the pin 165, therefore rotating with respect to the pedestal 160. FIG. 7 illustrates another view of the chest roller 150, with the sideplate 180 and wire gate 200 partially rotated, between the fully open position depicted in FIG. 4 and the fully closed position depicted in FIG. 3.

Figure 4:
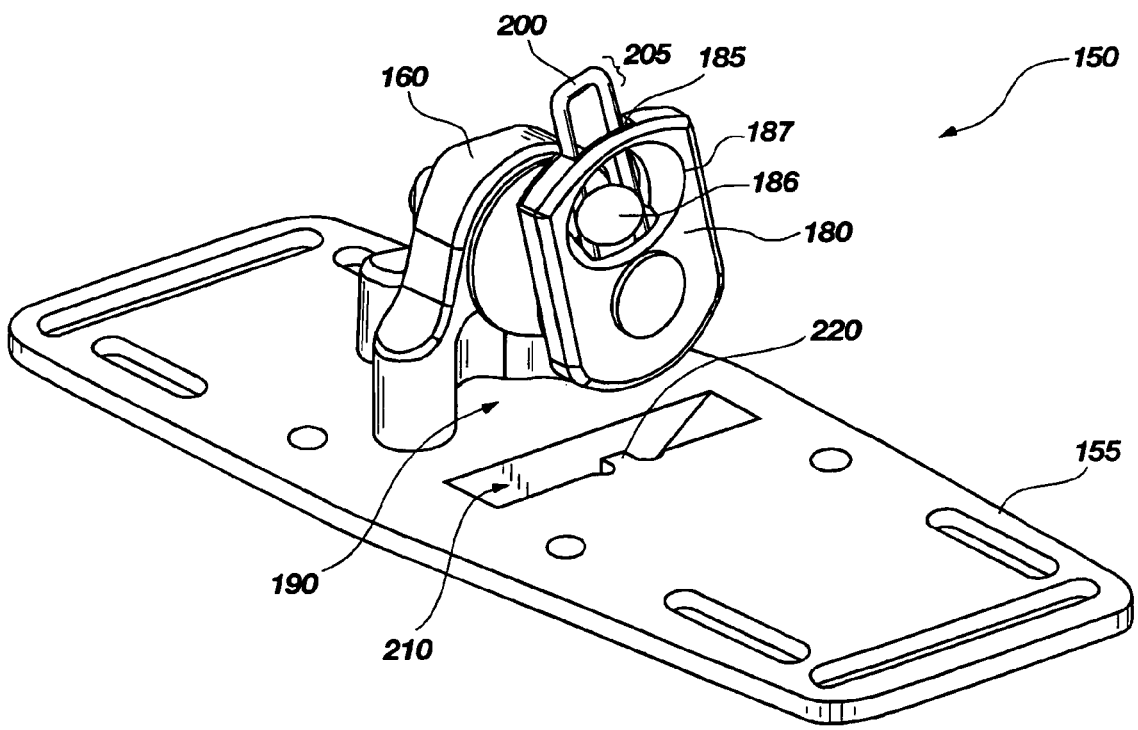

The wire gate 200 may optionally include a button, or knob 186, depicted in FIG. 4 affixed thereto. The knob 186 may be formed from, for example, a plastic or a metal, and provide a structure for a user to grasp or press to more easily manipulate the wire gate 200.

Figure 8:
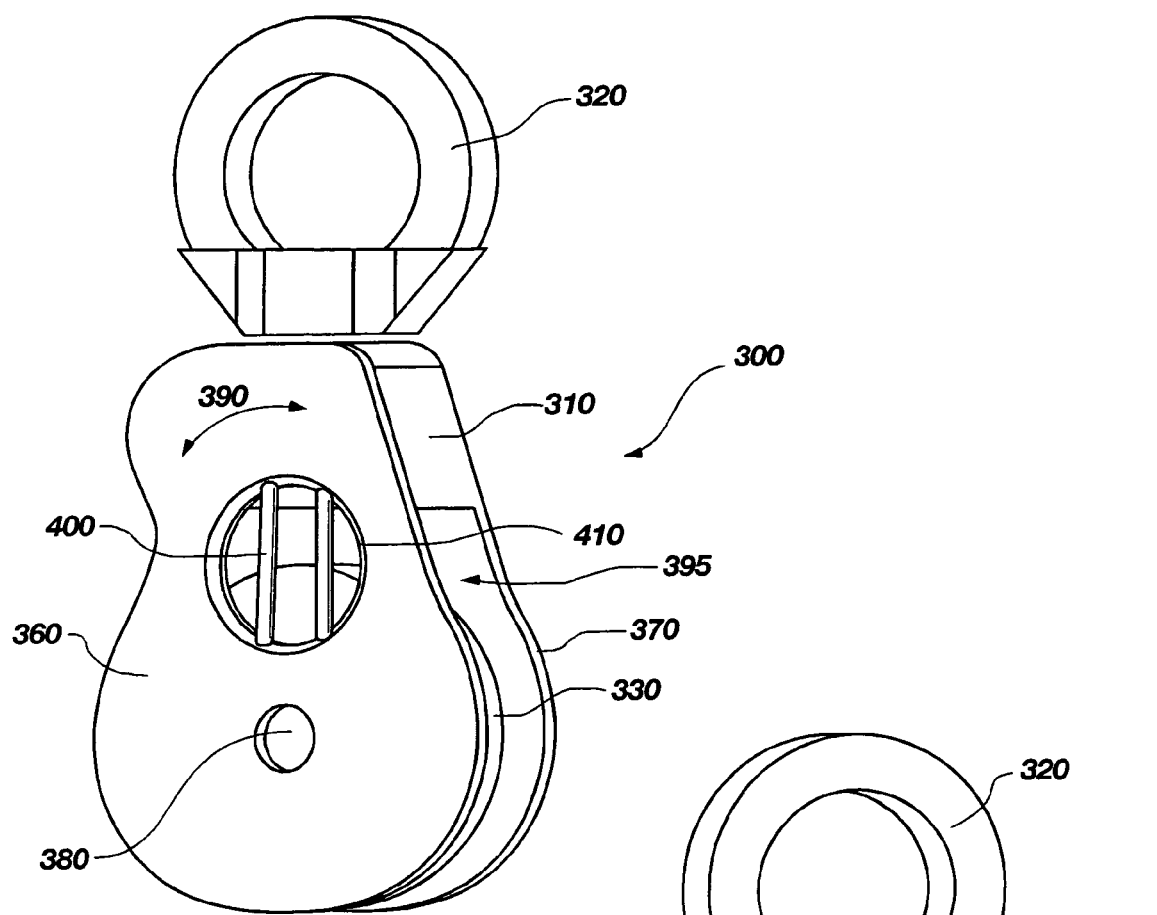
FIGS. 8 and 9 depict an exemplary embodiment of a snatch block and a wire latch of the present invention.
Figure 9:
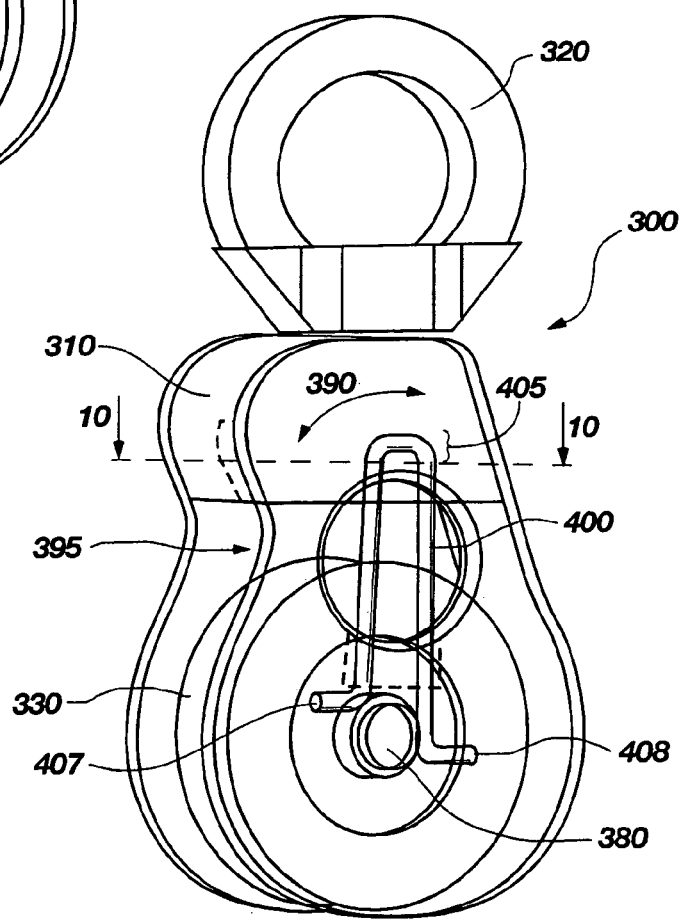

FIGS. 8 and 9 illustrate an exemplary embodiment of a snatch block 300 according to the present invention. A snatch block is a pulley-block that can be opened to receive a bight of a rope. Generally, the term "block" refers to a pulley or a system of pulleys set in a casing or housing. Conventionally, the casing is provided with a hook, eye, or strap, by which it may be attached to another structure. A pulley is a simple machine consisting essentially of a wheel or disk with a grooved rim, commonly termed a "sheave," in which a pulled rope or cable can be run to change the direction of a force applied to the rope or cable to move a load. The sheave may rotate directly on a pin, or on a bearing.

The snatch block 300 includes a first sideplate 360 and another, second sideplate 370 oriented substantially parallel thereto, the first and second sideplates 360 and 370 spaced apart by a pin 380. The second sideplate 370 is secured to an assembly head 310. The first sideplate 360, the second sideplate 370, and the assembly head 310 provide a casing for a sheave 330 carried by the pin 380. The first sideplate 360 is mounted to pivot with respect to the assembly head 310 about the pin 380 in directions shown by arrow 390. The snatch block 300 is shown in FIGS. 8 and 9 with the first sideplate 360 in a closed position, enabling a bight of rope (not shown) to be secured in a passageway 395 bounded by the assembly head 310, the first sideplate 360, the second sideplate 370 and the sheave 330. In the closed position of snatch block 300 as shown in FIGS. 8 and 9, a retaining device or mechanism shown schematically as a wire gate 400, engages the assembly head 310, preventing the first sideplate 360 from returning to the open position unless the retaining device is disengaged by a user. A U-shaped head 405 of the wire gate 400 may engage with a protrusion 315, 315' (see FIGS. 10A, 10B) of the assembly head 310.

The retaining device may be configured as a quick-release device, such as a device that requires only a single motion of a user's hand for disengagement, followed by rotation of first sideplate 360. One example of a quick-release device is the wire gate 400, shaped in an elongated loop and pivotally connected to the first sideplate 360. One end of the elongated loop comprises two stems 407, 408 each turned outward, for example, at substantially right angles, as seen in FIG. 9. The snatch block 300 is depicted in FIG. 9 with a transparent first sideplate 360, solely for convenience in viewing the assembly.

Figure 10A:
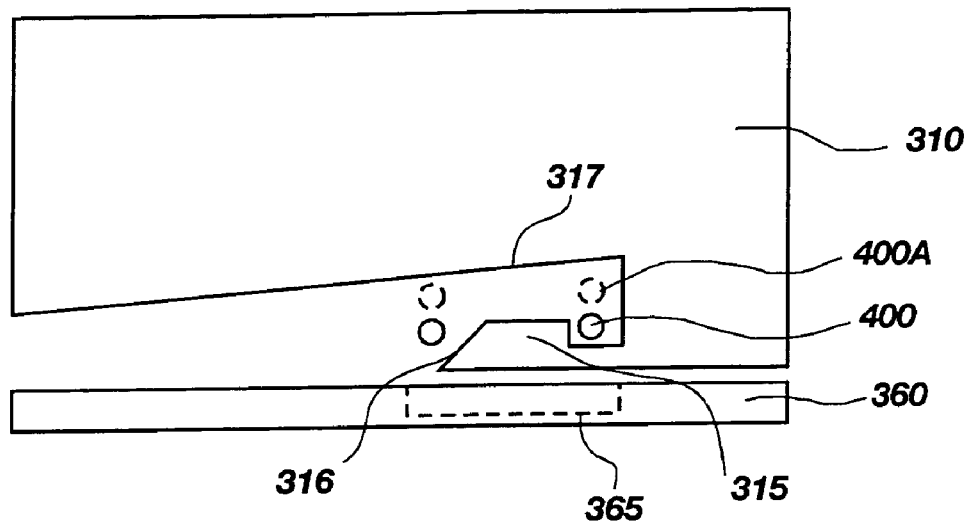
FIGS. 10A and 10B depict exemplary cross-sectional views of the snatch block of FIGS. 8 and 9.

The wire gate 400 may be biased either toward the first sideplate 360 in a direction transverse to the planes of the sideplates 360 and 370, or toward the assembly head 310 in a direction transverse to the planes of the sideplates 360 and 370. FIG. 10A depicts a cross-section of the snatch block 300 having a wire gate 400 biased toward the first sideplate 360, taken along line 10-10. The assembly head 310 includes a protrusion 315 for engaging with the wire gate 400, retaining the first sideplate 360 in position with respect to the second sideplate 370 and the assembly head 310. The wire gate 400 may be disengaged by a force applied to the wire gate 400 through an aperture 410 in the first sideplate 360, for example by a thumb or finger of the user. In such an instance, the wire gate 400 may be pivoted away from the first sideplate 360 about the stems 407, 408 of the wire gate 400 to be substantially entirely housed within a slot 317 of the assembly head 310, disengaging the protrusion 315 of the assembly head 310, as depicted in broken lines 400A in FIG. 10A. Moving the wire gate 400 to position 400A enables the first sideplate 360 to pivot with respect to the second sideplate 370. By way of a specific and nonlimiting example, a user may grasp the first sideplate 360 at sides thereof using the thumb and a finger of the same hand such as the third finger, depress wire gate 400 with the index finger of the same hand, and rotate or pivot the first sideplate 360 in a first direction with a turn of the wrist to an open position. A bight of rope may be inserted between the first and second sideplates 360 and 370 and over sheave 330, and the first sideplate 360 then grasped as before and rotated in the opposing direction to a closed position until the wire gate 400 is engaged by protrusion 315. A sidewall 316 of the protrusion 315 may optionally be tapered to urge the wire gate 400 away from the first sideplate 360 as the first sideplate 360 is rotated back to the closed position. The wire gate 400 may rotate with the first sideplate 360, and is thus movable with respect to the assembly head 310 in two directions. The wire gate 400 pivots on a fulcrum of the first sideplate, and rotates in conjunction with the first sideplate 360 about the pin 380.

Figure 10B:
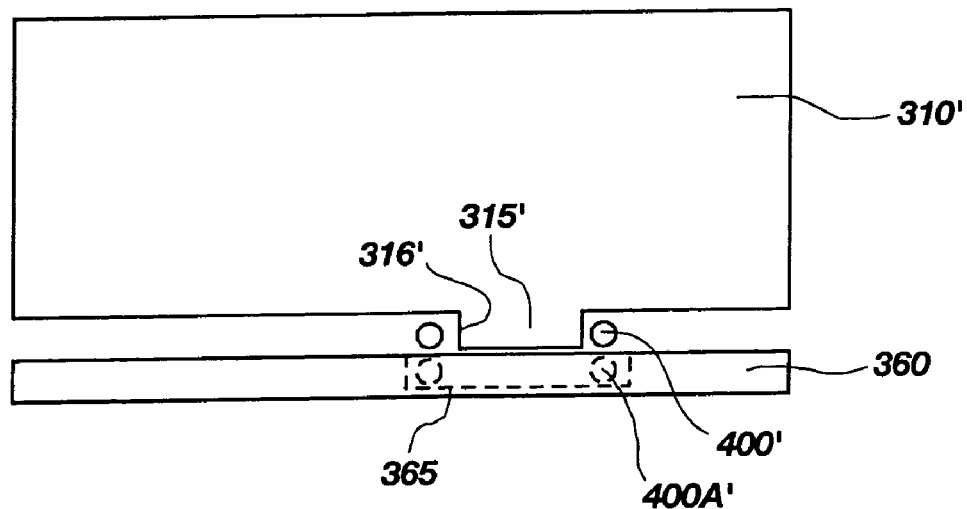

FIG. 10B depicts a cross-section of the snatch block 300 having a wire gate 400 biased toward the assembly head 310', taken along line 10-10. The assembly head 310' includes a protrusion 315' for engaging with the wire gate 400', retaining the first sideplate 360 in position with respect to the second sideplate 370 and the assembly head 310'. The wire gate 400' may be disengaged by a force applied to the wire gate 400' in the direction of the first sideplate 360. The force may be applied, for example, by a finger of the user inserted between the first sideplate 360 and the second sideplate 370. In another example, the user may hook the wire gate 400' through the aperture 410 with a finger, and pull the wire gate 400' toward the first sideplate 360. Alternatively, a button or knob may be affixed to the wire gate 400', and the user could grasp and pull the knob. The wire gate 400' may be pivoted toward the first sideplate 360 about the stems 407, 408 of the wire gate 400' to be substantially entirely housed within a cavity 365 of the first sideplate 360, disengaging the protrusion 315' of the assembly head 310', as depicted in broken lines 400A' in FIG. 10B. Moving the wire gate 400' to position 400A' enables the first sideplate 360 to pivot with respect to the second sideplate 370. A sidewall 316' of the protrusion 315 may be blunt, that is, substantially orthogonal to the plane of rotation of the first sideplate 360, or may optionally be tapered as depicted in FIG. 10A to urge the wire gate 400' away from the assembly head 310' as the first sideplate 360 is rotated back to the closed position.

The snatch block 300 additionally includes an attachment device 320 connected to the assembly head 310. The attachment device 320 enables the snatch block 300 to be connected to an anchor point, such as another structure, a tree, a rock, etc. The attachment device 320 is depicted as a ring; however, an attachment device including a hook, a shackle, or the like and as known in the art is encompassed within the scope of the invention. The attachment device 320 may be configured to swivel about an axis of rotation other than that of a sheave 330 of the snatch block 300, for example, substantially transverse thereto. The swivel action may prevent ropes used in rigging activities in conjunction with snatch block 300 from becoming twisted. The attachment device 320 is independent from the opening mechanism of the snatch block 300, enabling the snatch block 300 to be opened for rope insertion while the snatch block 300 is connected to an anchor point. The swivel feature enables the sheave 330 to be properly positioned to receive a rope bight, even after the snatch block 300 has been connected to the anchor point.

Figure 11:
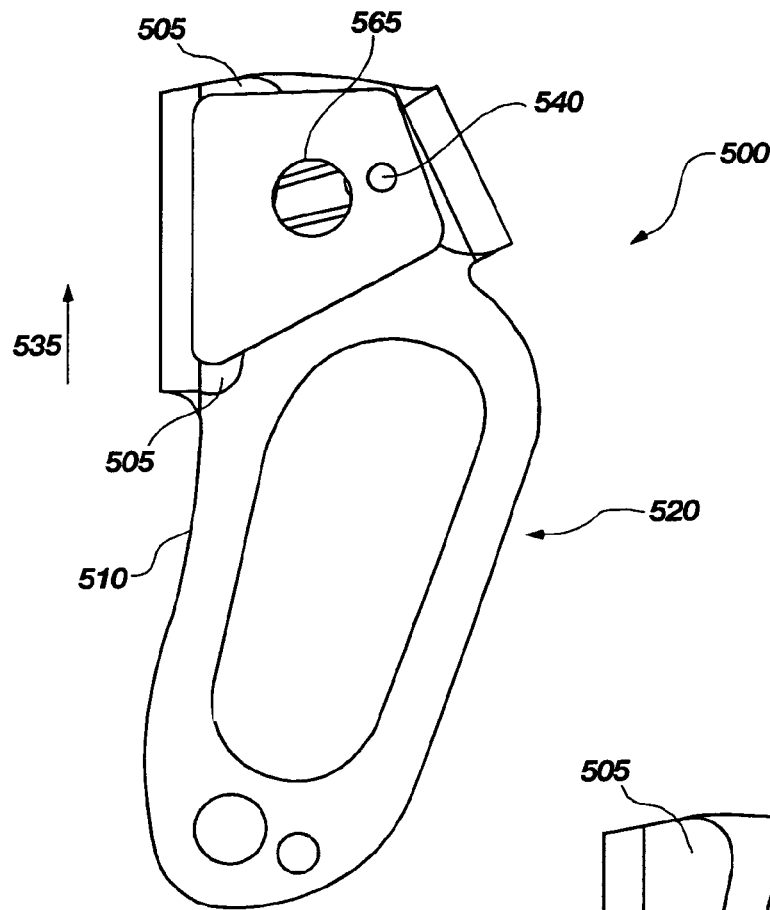
FIGS. 11-13 depict an exemplary embodiment of an ascender and a wire latch of the present invention.
Figure 12:
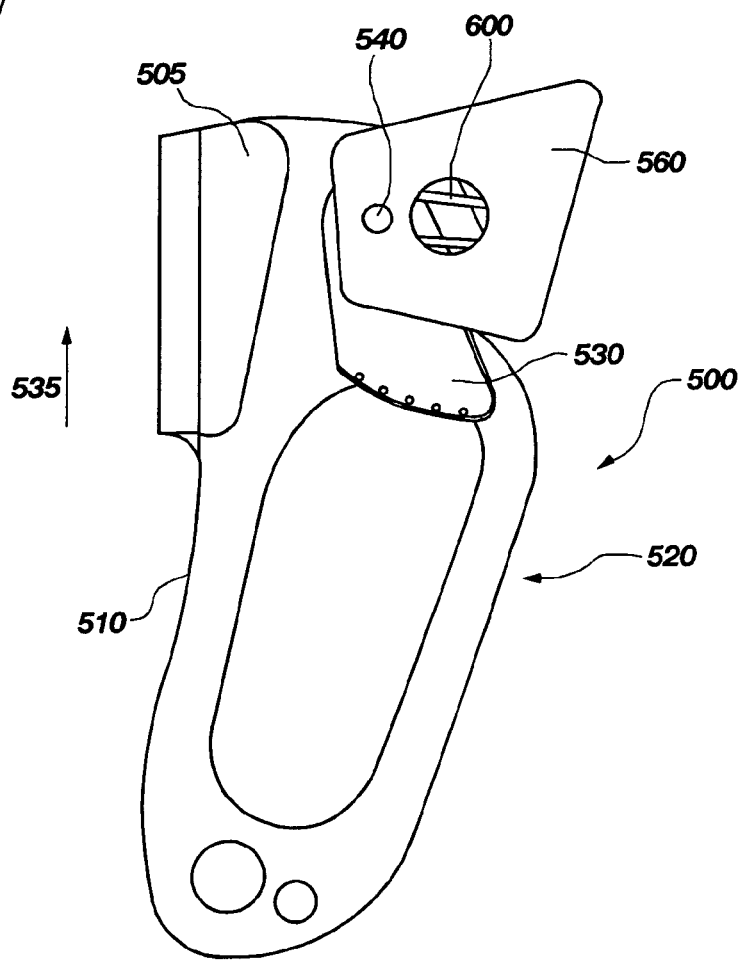
Figure 13:
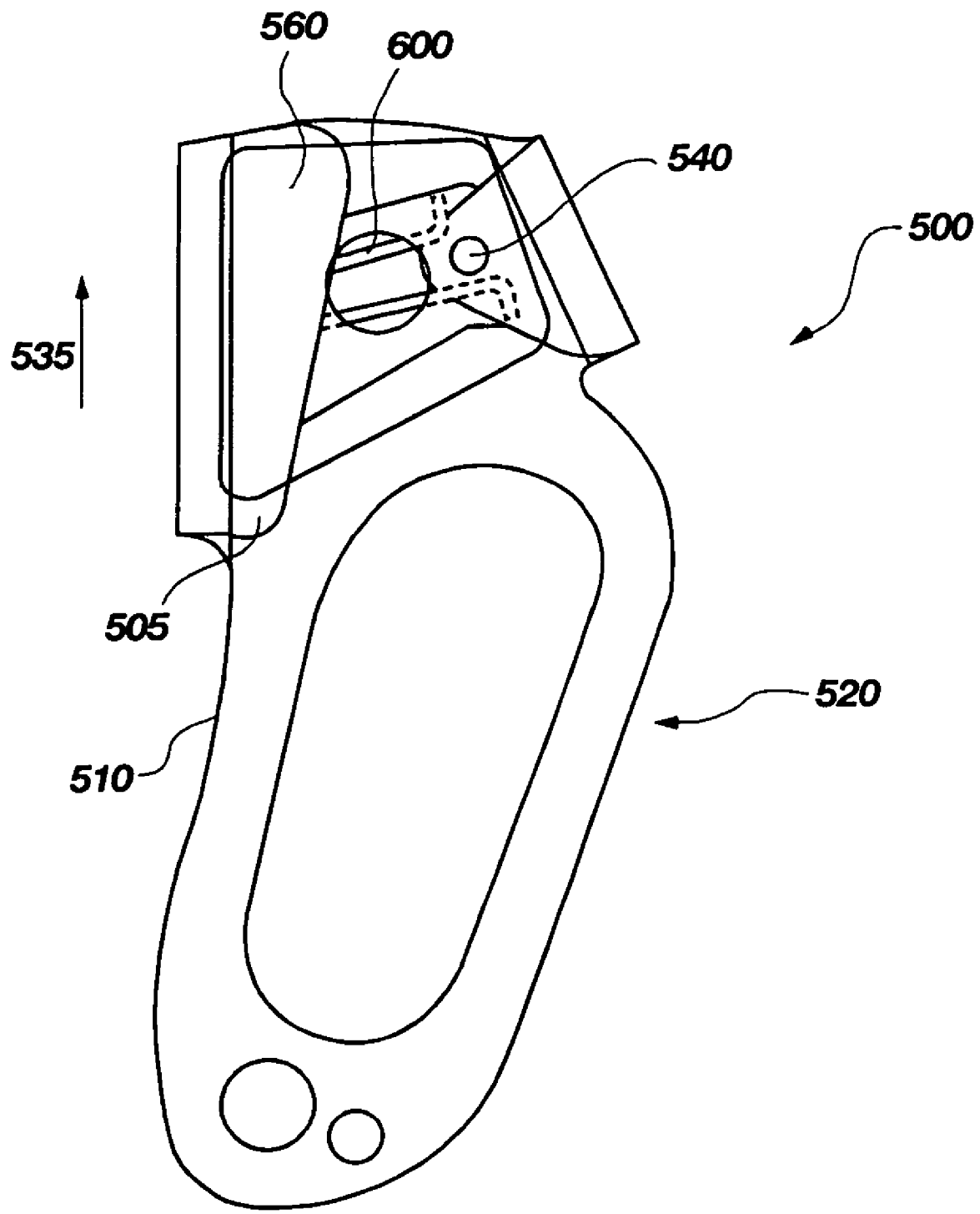

Yet another embodiment of the present invention, an ascender 500 of the having a closure system including a wire latch, is illustrated in FIGS. 11 through 13. An ascender is conventionally configured to be movably mounted on a rope or other elongated element for lifting and pulling a load as the ascender travels along the rope. The rope passes through the body of the ascender, and a locking device, typically a cam, allows movement of the ascender, with respect to the rope, in a first direction, and prevents movement of the ascender, with respect to the rope, in a second direction. The ascender includes a closure system, enabling the ascender to be attached or removed from a bight of rope.

FIG. 11 depicts the ascender 500 of the present invention. The ascender 500 has an ascender body 510 which may include a handle 520. An ascender without a handle, known as a rope grab, is also within the scope of the present invention. The ascender body 510 may include a flange 505, which forms a guide for the rope. A locking device, illustrated as a cam 530 is rotatably mounted on a pin 540. The cam 530 is configured to rotate toward an opposing surface of flange 505 in contact with the rope and grip the rope against flange 505 of the ascender body 510 when a downward force is exerted on the ascender 500. The shape of the cam 530 enables upward sliding movement, in direction 535, of the ascender 500 on the rope, without the cam 530 gripping the rope tightly against the ascender body 510.

A sideplate 560 may also be rotatably mounted on the pin 540. Alternatively, the cam 530 and the sideplate 560 may be rotatably mounted on independent axes. The ascender is illustrated in a closed, latched position in FIGS. 11 and 13, and an open position in FIG. 12. In the closed position, a bight of rope (not shown) may be positioned under the flange 505 and held in place by the cam 530. The sideplate 560 may restrain the cam 530 from excess rotation with respect to the body, which would disengage the cam 530 from the rope. The sideplate 560 may additionally prevent the rope from moving laterally from a position between cam 530 and flange 505. The ascender may be opened to release the rope by disengaging a retaining device or mechanism shown schematically as a wire gate 600, and rotating the sideplate 560, thereby enabling the cam 530 to rotate to the position shown in FIG. 12.

The wire gate 600 may engage a protrusion (not shown) on the flange 505 in a manner similar to that previously described and illustrated with respect to chest roller 150 and snatch block 300, thereby securing the sideplate 560. A user may contact the wire gate 600 as with a finger or fingers through an aperture 565 in the sideplate 560, and release the wire gate 600 by applying a force in the direction of the ascender body 510. The wire gate 600 pivots about a fulcrum on the sideplate 560 at the location where it is mounted thereto, again as previously described and illustrated with respect to the wire gates employed with chest roller 150 and snatch block 300 with an axis of rotation different than, such as substantially transverse to, an axis of rotation of the sideplate 560.

The closure system of the present invention is simple, inexpensive to make, and may be constructed in a wide range of sizes. A closure system employing a wire gate may be very resistant to interference and even jamming due to the presence of dirt and mud. The bias employed in operating the closure system is created by the structure of the wire gate itself and so does not require a spring, and may therefore resist jamming and be easily cleaned. The closure system of the present invention is easily operated, and may be opened or closed by a user by "feel," and while wearing gloves. Additionally, the closure system of the present invention includes no loose parts.

Although the foregoing description contains many specifics, these are not to be construed as limiting the scope of the present invention, but merely as providing certain exemplary embodiments. Similarly, other embodiments of the invention may be devised which do not depart from the spirit or scope of the present invention. For example, a snatch block including a plurality of sheaves is also encompassed by the present invention. The closure system of the present invention may be used in a number of additional devices, for example, a carabiner, a window, or a sliding cover. The scope of the invention is, therefore, indicated and limited only by the appended claims and their legal equivalents, rather than by the foregoing description. All additions, deletions, and modifications to the invention, as disclosed herein, which fall within the meaning and scope of the claims are encompassed by the present invention.

What is claimed is:

1. A closure system comprising:
   a base having an engagement protrusion;
   a pin carried by the base;
   a sideplate configured to rotate about the pin; and
   a retaining mechanism carried by the sideplate and configured to pivot with respect to the sideplate substantially transverse to an axis of rotation of the sideplate, the retaining mechanism configured to engage with the engagement protrusion of the base to prevent rotation of the sideplate.

2. The closure system of claim 1, wherein the retaining mechanism comprises a wire gate.

3. The closure system of claim 2, wherein the wire gate comprises a single piece of wire, bent into a U-shape with two oppositely facing free ends.

4. The closure system of claim 3, wherein the sideplate includes offset holes, the two oppositely facing free ends secured therein.

5. The closure system of claim 1, wherein the retaining mechanism comprises a resiliently biased body.

6. The closure system of claim 5, wherein the retaining mechanism is resiliently biased toward the sideplate.

7. The closure system of claim 5, wherein the retaining mechanism is resiliently biased away from the sideplate.

8. The closure system of claim 1, wherein the retaining mechanism is configured to rotate about the pin in conjunction with the sideplate.

9. The closure system of claim 1, wherein the sideplate includes a notch configured to at least partially house the retaining mechanism.

10. The closure system of claim 1, wherein the retaining mechanism provides structural support between the sideplate and the base when engaged therewith.

11. The closure system of claim 1, wherein the sideplate includes an aperture for accessing the retaining mechanism.

12. The closure system of claim 1, wherein the retaining mechanism includes a knob.

13. A chest roller comprising:
   a baseplate;
   a pedestal mounted on the baseplate, the pedestal including a pin protruding therefrom;
   a sheave rotatable about the pin;
   a sideplate rotatable about the pin;
   a retaining mechanism configured to pivot with respect to the sideplate substantially transverse to an axis of rotation of the sideplate, the retaining mechanism configured to engage with the baseplate to prevent rotation of the sideplate.

14. The chest roller of claim 13, wherein the retaining mechanism comprises a wire gate.

15. The chest roller of claim 14, wherein the wire gate comprises a single piece of wire, bent into a U-shape with two oppositely facing free ends.

16. The chest roller of claim 15, wherein the sideplate includes offset holes, the two oppositely facing free ends secured therein.

17. The chest roller of claim 13, wherein the retaining mechanism comprises a resiliently biased body.

18. The chest roller of claim 17, wherein the retaining mechanism is resiliently biased toward the sideplate.

19. The chest roller of claim 17, wherein the retaining mechanism is resiliently biased away from the sideplate.

20. The chest roller of claim 13, wherein the retaining mechanism is configured to rotate about the pin in conjunction with the sideplate.

21. The chest roller of claim 13, wherein the sideplate includes a notch configured to at least partially house the retaining mechanism.

22. The chest roller of claim 13, wherein the retaining mechanism provides structural support between the sideplate and the baseplate when engaged therewith.

23. The chest roller of claim 13, wherein the sideplate includes an aperture for accessing the retaining mechanism.

24. The chest roller of claim 13, wherein the retaining mechanism includes a knob.

25. The chest roller of claim 13, further comprising:
a slot in the base; and
a protrusion extending into the slot in the base for engaging with the retaining mechanism.

26. A snatch block, comprising:
an assembly head having an engagement protrusion;
one sideplate fixed to the assembly head;
a pin projecting from the one sideplate;
at least another sideplate pivotally mounted with respect to the assembly head about the pin;
a sheave mounted between the one sideplate and the at least another sideplate for rotation about the pin; and
a retaining mechanism carried by the at least another sideplate and configured to pivot with respect to the at least another sideplate substantially transverse to an axis of rotation of the at least another sideplate, the retaining mechanism configured to engage with the engagement protrusion of the assembly head to prevent rotation of the at least another sideplate.

27. The snatch block of claim 26, wherein the retaining mechanism comprises a wire gate.

28. The snatch block of claim 27, wherein the wire gate comprises a single piece of wire, bent into a U-shape with two oppositely facing free ends.

29. The snatch block of claim 28, wherein the at least another sideplate includes offset holes, the two oppositely facing free ends secured therein.

30. The snatch block of claim 26, wherein the retaining mechanism comprises a resiliently biased body.

31. The snatch block of claim 30, wherein the retaining mechanism is resiliently biased toward the at least another sideplate.

32. The snatch block of claim 30, wherein the retaining mechanism is resiliently biased away from the at least another sideplate.

33. The snatch block of claim 26, wherein the retaining mechanism is configured to rotate about the pin in conjunction with the at least another sideplate.

34. The snatch block of claim 26, wherein the at least another sideplate includes a notch configured to at least partially house the retaining mechanism.

35. The snatch block of claim 26, wherein the retaining mechanism provides structural support between the at least another sideplate and the assembly head when engaged therewith.

36. The snatch block of claim 26, wherein the at least another sideplate includes an aperture for accessing the retaining mechanism.

37. The snatch block of claim 26, wherein the retaining mechanism includes a knob.

38. An ascender, comprising:
a body having a flange and an engagement protrusion;
a pin projecting from the body;
a locking device rotatably mounted on the body, configured for engaging an elongated element against the flange;
a sideplate pivotally mounted with respect to the body about the pin; and
a retaining mechanism carried by the sideplate and configured to pivot with respect to the sideplate substantially transverse to an axis of rotation of the sideplate, the retaining mechanism configured to engage with the engagement protrusion of the body to prevent rotation of the sideplate.

39. The ascender of claim 38, wherein the retaining mechanism comprises a wire gate.

40. The ascender of claim 39, wherein the wire gate comprises a single piece of wire, bent into a U-shape with two oppositely facing free ends.

41. The ascender of claim 40, wherein the sideplate includes offset holes, the two oppositely facing free ends secured therein.

42. The ascender of claim 38, wherein the retaining mechanism comprises a resiliently biased body.

43. The ascender of claim 42, wherein the retaining mechanism is resiliently biased toward the sideplate.

44. The ascender of claim 42, wherein the retaining mechanism is resiliently biased away from the sideplate.

45. The ascender of claim 38, wherein the retaining mechanism is configured to rotate about the pin in conjunction with the sideplate.

46. The ascender of claim 38, wherein the sideplate includes a notch configured to at least partially house the retaining mechanism.

47. The ascender of claim 38, wherein the retaining mechanism provides structural support between the sideplate and the body when engaged therewith.

48. The ascender of claim 38, wherein the sideplate includes an aperture for accessing the retaining mechanism.

49. The ascender of claim 38, wherein the retaining mechanism includes a knob.

50. A method of using a closure system, comprising: providing a closure system comprising:
a base having an engagement protrusion;
a pin carried by the base;
a sideplate configured to rotate about the pin; and
a retaining mechanism carried by the sideplate and configured to pivot with respect to the sideplate substantially transverse to an axis of rotation of the sideplate, the retaining mechanism configured to engage with the engagement protrusion of the base to prevent rotation of the sideplate;
pivoting the retaining mechanism substantially traverse to the axis of rotation of the side plate against a resilient bias to disengage the retaining mechanism from the engagement protrusion of the base; and
pivoting the sideplate about the pin.

51. The method of claim 50, further comprising effecting the pivoting with a single hand of a user.

* * * * *

UNITED STATES PATENT AND TRADEMARK OFFICE
CERTIFICATE OF CORRECTION

Page 1 of 2

PATENT NO.        : 7,669,835 B2
APPLICATION NO.   : 11/049375
DATED             : March 2, 2010
INVENTOR(S)       : Rocke P. Thompson It is certified that error appears in the above-identified patent and that said Letters Patent is hereby corrected as shown below:

On the title page:
In ITEM (73) Assignee:        change "Techxotic LC," to --Techxotic, LC,--

In the drawings:
    FIG. 2C         delete reference numeral "28" with its corresponding arrowhead lead line.

Replace FIG. 2C with the following amended figure:

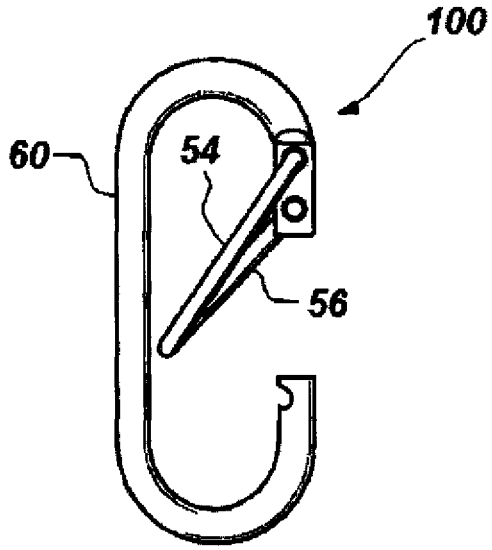

FIG. 2C
(PRIOR ART)

Signed and Sealed this
Thirty-first Day of July, 2012

David J. Kappos
*Director of the United States Patent and Trademark Office*

CERTIFICATE OF CORRECTION (continued)
U.S. Pat. No. 7,669,835 B2

In the specification:

| | | |
|---|---|---|
| COLUMN 1, | LINE 64, | change "body 60 50 that" to --body 60 so that-- |
| COLUMN 2, | LINE 7, | change "along the major" to --along major-- |
| COLUMN 2, | LINE 8, | change "FIG. 2*c*" to --FIG. 2C-- |
| COLUMN 4, | LINE 7, | change "pin" to --pin 165,-- |
| COLUMN 6, | LINE 12, | change "400" to --400'-- |
| COLUMN 6, | LINE 30, | change "400A'enables" to --400A' enables-- |
| COLUMN 6, | LINE 32, | change "protrusion 315" to --protrusion 315'-- |
| COLUMN 6, | LINE 59, | change "500 of the having" to --500 having-- |
| COLUMN 7, | LINE 19, | change "ascender is" to --ascender 500 is-- |
| COLUMN 7, | LINE 24, | change "the body," to --the body 510,-- |
| COLUMN 7, | LINE 28, | change "ascender may" to --ascender 500 may-- |

In the claims:

| | | |
|---|---|---|
| CLAIM 25, COLUMN 9, | LINE 17, | change "base;" to --baseplate;-- |
| CLAIM 25, COLUMN 9, | LINE 18, | change "base" to --baseplate-- |
| CLAIM 50, COLUMN 10, | LINE 55, | change "traverse" to --transverse-- |